Dec. 6, 1966    J. E. BRUNK    3,289,979
HIGH LIFT WING AND FLAP STRUCTURE FOR AIRCRAFT
Filed May 24, 1965
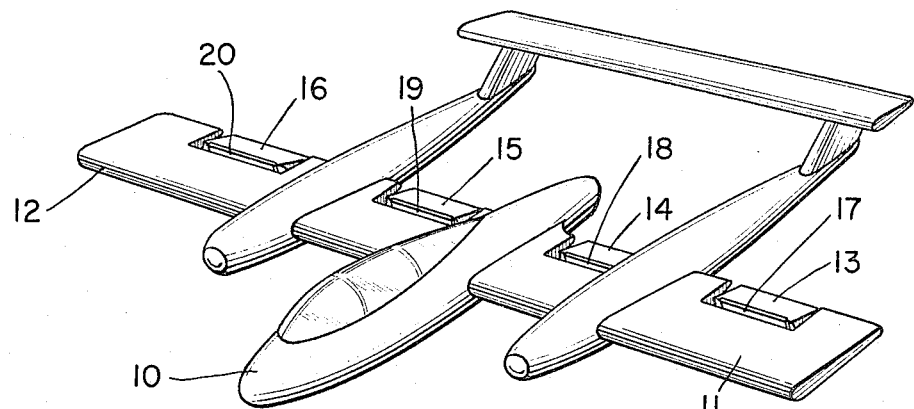
FIG. 1.
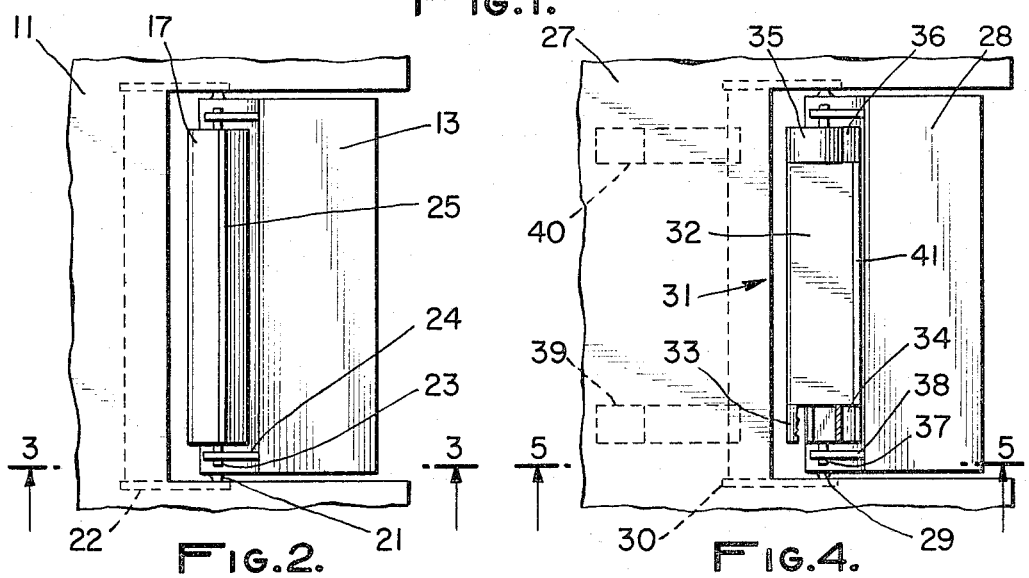
FIG. 2.
FIG. 4.
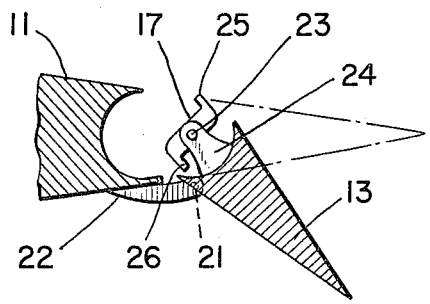
FIG. 3.
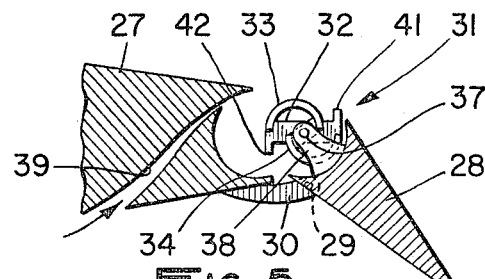
FIG. 5.
INVENTOR.
JAMES E. BRUNK
BY
Elliott & Pastoriza
ATTORNEYS

United States Patent Office 3,289,979
Patented Dec. 6, 1966

3,289,979
HIGH LIFT WING AND FLAP STRUCTURE FOR AIRCRAFT
James E. Brunk, 1266 Coast Village Road, Santa Barbara, Calif.
Filed May 24, 1965, Ser. No. 458,182
4 Claims. (Cl. 244—42)

This invention relates generally to aircraft and more particularly to a novel high lift wing and flap structure for improving air flow over the junction of the wing and flap in a manner to provide greatly increased efficiency.

For realizing maximum lift in aircraft, it is desirable that the air flow over the top surface of the wing and flap structure be continuous. In actual practice, however, the boundary layer air flow experiences a discontinuity at the junction of the flap surface and wing surface. This discontinuity primarily results from the change in angle of the surface over which the air is flowing. Further eddy flows and disturbances are created at the intersection itself wherein gaps are usually present. As a consequence, the desirable smooth, continuous laminar type flow is disrupted at the trailing edge of the wing with a consequent loss in lift and efficiency.

The problem has been treated in the past by providing auxiliary means for minimizing the discontinuity. For example, it has been proposed to actually pump air or create an artificial air flow at the junction of the flap and wing in such a manner as to aid in the continuous flow of the main body of air over the wing and flap. Towards this end, there have been proposed rotating cylindrical structures which are powered by sources in the aircraft in an attempt to modify the air flow in a desired manner. While some success has been achieved in this manner, the auxiliary power sources have generally increased the weight and bulk of the aircraft. Further, careful control of the times at which the mechanism is to be energized is necessary and thus further requirements for a pilot flying the aircraft are imposed.

With the foregoing in mind, it is a primary object of the present invention to provide an improved high lift wing and flap structure in which the foregoing problems are overcome.

More particularly, it is an object to provide an improved high lift wing and flap structure which is completely automatic and constitutes passive elements for modifying the air flow in such a manner as to maintain continuity of the flow over the wing and flap surfaces even though a relatively large angle may exist therebetween, all to the end that auxiliary sources of power and controls are avoided.

Briefly, these and many other objects and advantages of this invention are attained by employing an auto-rotating means between the wing and flap structures. The auto-rotating means is responsive to the air flow over the surfaces of the wing and flap to set itself into rotation and is so designed that such rotation will modify the air flow conditions at the intersection to maintain a smooth, continuous air flow over the surfaces. Since the structure is self-powering, there is no need for auxiliary equipment and the like. Moreover, there is no need for additional conrtols to place the mechanism in operation.

A better understanding of the invention will be had by now referring to the accompanying drawings, in which:

FIGURE 1 is a perspective view of an aircraft incorporating the high lift wing and flap structure of this invention;

FIGURE 2 is an enlarged fragmentary plan view of a portion of one of the wings of the aircraft in FIGURE 1;

FIGURE 3 is a cross-section taken in the direction of the arrows 3—3 of FIGURE 2;

FIGURE 4 is another fragmentary plan view of a modification of the structure of the wing and flap; and, FIGURE 5 is a cross-section taken in the direction of the arrows 5—5 of FIGURE 4.

Referring to FIGURE 1, there is shown an aircraft 10 having wings 11 and 12 with a series of flaps 13, 14, 15 and 16 coupled adjacent to the trailing edges of the wings. In accord with the present invention, an auto-rotating means is interposed between the various flaps and the wings as indicated at 17, 18, 19, and 20.

Referring now to FIGURE 2, there is shown in enlarged fragmentary plan view details of the flap 13 an auto-rotating means 17 described in FIGURE 1. Since the other flap and auto-rotating means described in FIGURE 1 are identical to the flap 13 and auto-rotating means 17, description of these latter elements will suffice for all.

As shown in FIGURE 2, the flap 13 is hinged adjacent to the trailing edge of the wing 11 as by pivots 21 and flap bracket supports 22. The auto-rotating means 17, in turn, is mounted for rotation by pivot shaft 23 supported in a journaling bracket 24 secured to the flap 13.

As best shown in FIGURE 3, the auto-rotating means 17 is in the form of a generally rectangularly shaped member in cross-section and includes diagonally opposite upper and lower projections 25 and 26 extending generally normally to the plane of the member to define longitudinal vanes. These vanes project upwardly above the top surfaces of the wing 11 and flap 13 and will thus intercept air flow over the top surface of the wing thereby causing rotation of the member 17. These projecting vanes thus define certain surfaces that extend through the boundary layer of air on the surface of the wing and flap while other surface portions of the rectangularly shaped member lie beneath the boundary layer. The auto rotating means thus includes surface portions at different radial distances from its axis of rotation.

With the foregoing arrangement, the local velocity at the uppermost portion of the longitudinal vanes during the rotating cycle will be at least as great as the velocity of the rotating vane itself. The peripheral velocity of the rotating vanes will approach this local flow velocity.

From the uppermost point in the periphery of the auto-rotating member towards its center of rotation, the air flow velocity will decrease approximately as the distance from the center of rotation defined by the mounting pivot shaft 23. However, the relatively low velocity boundary layer flow coming from the forward upper wing surface will encounter only the large local flow velocity at the rotor vanes and hence will be accelerated. This energization of the boundary layer plus the redirection of the flow downward due to the configuration of the vanes on the member 17 will eliminate or effectively reduce the separation of the flow of air from the upper surface of the flap. As a consequence, a continuity of the air flow over the top surface of the wing 11 and the top surface of the flap 13 will be maintained even though the flap may swing downwardly about its hinge axis 21 to a considerable angle.

Referring now to FIGURES 4 and 5, there is shown a modification of the flap and wing structure wherein there is illustrated a wing 27 having a flap 28 hinged to the wing as by pivot pin 29 and flap bracket 30. An auto-rotating means designated generally at 31 includes a central elongated member 32 of configuration similar to the member 17 described in conjunction with FIGURES 2 and 3.

In addition, there are provided end vane means at each end of the elongated member 32. Each of these vane means are comprised of semi-cylindrical sections such as indicated at 33 and 34 at one end of the member 32 and 35 and 36 at the other end of the member 32. These end vane means together with the central auto-rotating member 32 are mounted for rotation on a shaft 37 supported by suitable brackets 38 to the flap 28.

As best shown in FIGURE 5, the end vane semi-cylindrical sections 33 and 34 have their axes parallel and equally spaced on opposite sides of the axis of rotation for the member 32 defined by the shaft 37 with their concave surfaces in opposing, off-set relationship.

The modified structure of FIGURES 4 and 5 also include air ducts 39 and 40 passing from the underside of the wing 27 and exiting adjacent to the upper portions of the end vanes.

In the operation of the structure described in FIGURES 4 and 5, the auto-rotating means 31 is caused to rotate as a consequence of air flow over the top surface of the wing 27 and further rotational velocity is imparted through impingement of air passing through the air ducts 39 and 40 and over the end vanes. Again, the rotation of the member 32 accelerates the air flow at the intersection of the top wing surface and flap surface in such a manner as to inhibit a discontinuity or separation of the air flow over the flap surface from the wing surface so that a continuity is maintained with the resultant advantage of increased lift and efficiency.

From the foregoing description, it will thus be evident that the present invention has provided a greatly improved high lift wing and flap structure for aircraft wherein the advantages of increased lift and efficiency are realized without the necessity of auxiliary power sources or additional controls demanding the attention of the pilot.

While the auto-rotating means described have been of a particular configuration, other cross-sectional configurations could be employed such as S-shaped structures or turbine-like blade arrangements. It is found that such structures as well as the generally rectangular cross-section with the oppositely extending vanes provide a greatly improved result over pure cylindrical type configurations.

What is claimed is:

1. A high lift wing and flap structure for aircraft comprising, in combination: a wing; a flap coupled to said wing adjacent to the trailing edge of said wing; and an auto-rotating means mounted between said flap and wing for rotation about an axis generally parallel to the trailing edge of said wing, said auto-rotating means having surface portions at different radial distances from its axis of rotation such that certain surface portions extend up through the plane of the boundary layer of air on said wing over a major portion of the span of said wing into higher velocity air flow and other surface portions lie beneath the plane of the boundary layer, said auto-rotating means being responsive to said higher velocity air flow over the top surfaces of said wing and flap to rotate and thereby modify the flow conditions at the intersection of said wing and flap in a manner to maintain a continuity in said air flow from said wing surface to said flap surface.

2. A structure according to claim 1, in which said auto-rotating means includes an elongated member having a general rectangular shape in cross-section with diagonally opposite upper and lower longitudinal edges projecting upwardly and downwardly respectively approximately normally from the plane of said member in the form of longitudinal vanes to define said certain surface portions for effecting auto-rotation of said member.

3. A structure according to claim 2, in which said auto-rotating means additionally includes an end vane means affixed to each opposite longitudinal end of said member, said end vane means comprising two semi-cylindrical sections, the axis of each section being parallel to and equally spaced on opposite sides of the axis of rotation of said member so that their concave surfaces are in opposing, off-set relationship, said wing including at least one air duct passing from its under side and exiting adjacent to the upper portion of said end vane means.

4. A structure according to claim 3, including flap bracket means hinging said flap to said wing, the axis of hinging being parallel and adjacent to said axis of rotation of said auto-rotating means.

References Cited by the Examiner
UNITED STATES PATENTS

| | | | |
|---|---|---|---|
| 2,464,663 | 3/1949 | Zingg | 244—40 X |
| 2,569,983 | 10/1951 | Favre | 244—42 |
| 3,092,354 | 6/1963 | Calderon | 244—42 X |
| 3,162,402 | 12/1964 | Calderon | 244—42 |
| 3,178,131 | 4/1965 | Laing | 244—42 |

MILTON BUCHLER, *Primary Examiner.*

B. BELKIN, *Assistant Examiner.*